Patented Apr. 19, 1932

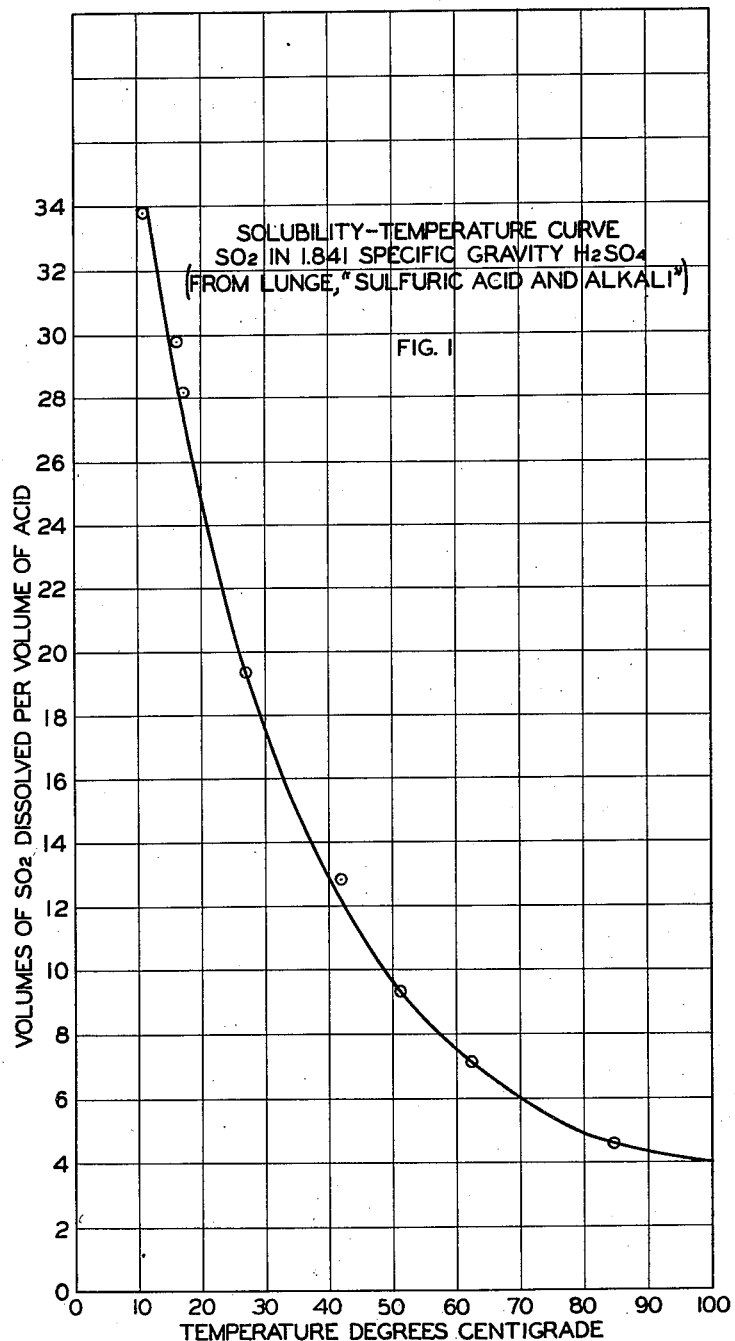

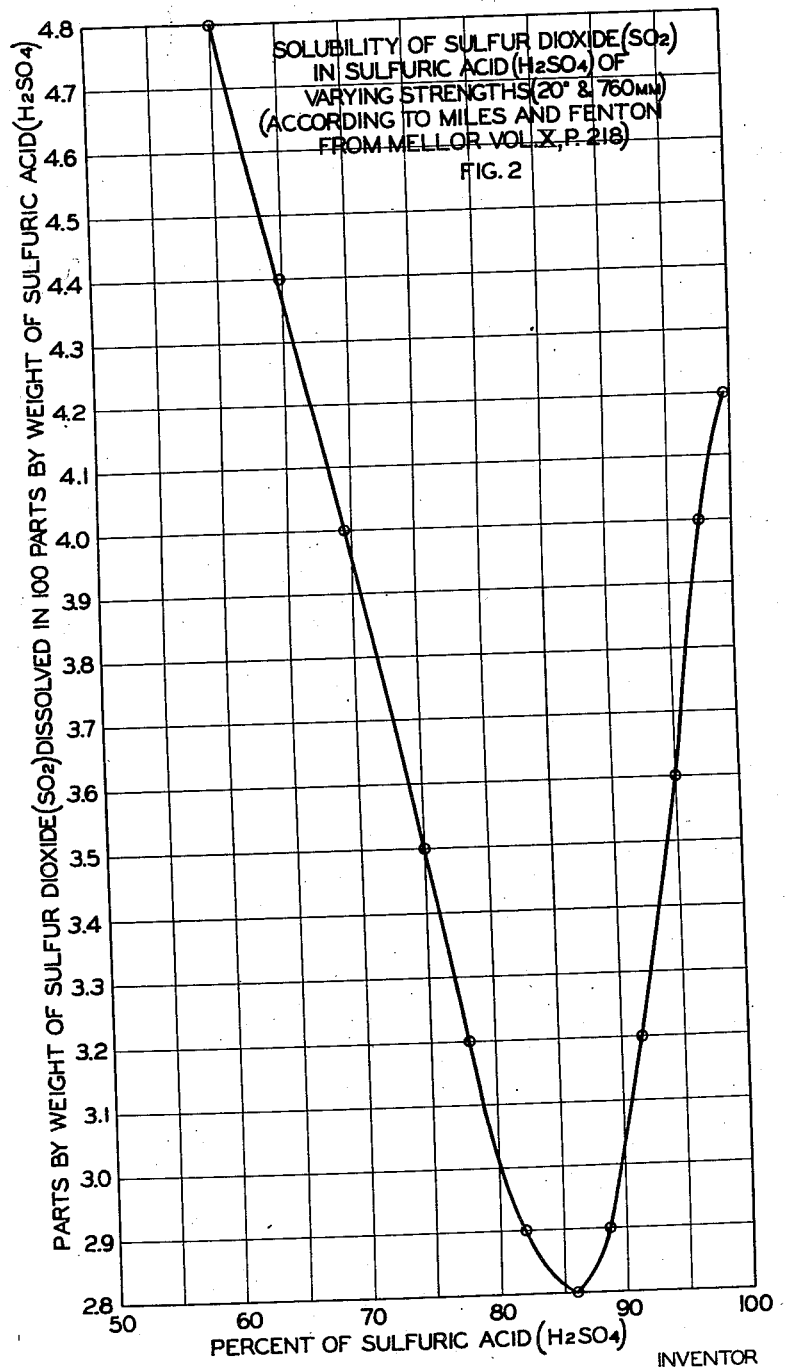

1,854,417

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

TREATMENT OF HYDROCARBON OILS

Application filed February 6, 1931. Serial No. 513,981.

This invention relates to the treatment of hydrocarbon oils and refers more particularly to the treatment of cracked distillates to improve their quality. The present application is a continuation in part of my copending application of Serial No. 74,398, of Dec. 9, 1925, and also of my application of Serial No. 403,913 of Oct. 31, 1929.

The present invention is more specifically concerned with the treatment of cracked distillates with suitable reagents under proper conditions of temperature and pressure to effect a maximum removal of sulfur-containing and relatively polymerizable substances with a minimum removal of compounds of the type of mono-olefines which have pronounced value as antiknock components of hydrocarbon mixtures.

To accomplish a selective treatment of cracked distillates for effecting the objects mentioned, many chemical reagents of varying character have been utilized with varying degrees of success. The most common reagent used for the treatment of cracked distillates to improve their color, odor and total sulfur content has been sulfuric acid, this being employed in varying concentrations from those acids above the mono-hydrate and containing large percentages of free sulfur trioxide to acids of relatively low concentration, which are only effective in removing bodies of a definitely basic nature, such as pyridines or amino compounds of different types. In treating highly unsaturated cracked distillates which frequently contain high percentages of sulfur, by the use of strong sulfuric acid such as 66° Bé. acid at atmospheric temperatures, desired sulfuric reductions are frequently attained only with an excessive loss of olefinic components which if allowed to remain would add to the antiknock value of the treated oil, as well as to the total volume of oil recovered. This phenomenon is due to the fact that such acids at ordinary temperatures exhibit a marked reactivity with the olefinic hydrocarbons, particularly di- and tri-olefinic compounds as well as with the sulfur derivatives of hydrocarbons. When strong acids are used at lower temperatures than atmospheric there is to some extent a more selective action on the sulfur content of cracked distillates than on the olefines, but there is still a tendency for reactions to occur with loss of desirable unsaturated hydrocarbons when proper sulfur reduction is effected, especially with sulfuric acid of high concentration. The present invention discloses an improvement over prior sulfuric acid treating processes which permits the selective removal from cracked distillates of sulfur compounds and polyolefines without effecting the excessive removal or polymerization of desirable mono-olefines.

In one specific embodiment of the invention cracked distillates are treated at temperatures materially lower than atmospheric with sulfuric acid substantially saturated with sulfur dioxide, superatmospheric pressures preferably being employed to increase the solubility of the sulfur dioxide in the acid and oil. To show some of the relations between the solubility of sulfur dioxide in sulfuric acid as against variations in temperature and strength of acid, the curves shown in Fig. 1 and Fig. 2 are appended. The curve in Fig. 1 shows the volume of sulfur dioxide dissolved per volume of 1.84 specific gravity sulfuric acid as a function of the temperature and indicates that the solubility approaches a maximum as the temperature of the acid is reduced to approach its freezing point. Fig. 2, which shows the parts by weight of sulfur dioxide dissolved by 100 parts by weight of sulfuric acid as a function of the percentage of sulfuric acid indicates that the solubility passes thru a minimum value at approximately 86% sulfuric acid and rises rapidly either side of this point. The following table, which includes composite data published by Knietsch and by Miles & Fenton, indicates a triple relationship between percentage sulfuric acid, melting point degrees F. and the weight of sulfur dioxide dissolved by the acids at 20° C.

| Knietsch's data [1] | | Miles & Fenton data [2] |
|---|---|---|
| % $H_2SO_4$ | M. P. °F. | 20° C. and 760 mm. g. $SO_2$ dissd. by 100 g. acid |
| 86.9 | +30 | 2.83 |
| 88.3 | +19 | 2.90 |
| 89.6 | +3 | 3.04 |
| 90.6 | −13 | 3.15 |
| 91.9 | −39 | 3.25 |
| 93.1 | −26 | 3.39 |
| 94.3 | −19 | 3.54 |
| 95.6 | +2 | 3.70 |
| 97.7 | +23 | 4.00 |
| 98.2 | +37 | 4.06 |
| 98.8 | +50 | 4.50 |

[1] Sulfuric Acid and Alkali—Geo. Lunge.
[2] Mellor; Vol. X, p. 218.

It will be evident from the table and the figures that by utilizing sulfuric acids between the concentrations of approximately 90 and 97%, that large amounts of sulfur dioxide can be dissolved therein, particularly at temperatures between the range of +20 to −15° F. and it has been found that treating reagents of this type are particularly effective in selectively removing sulfur and diolefinic hydrocarbons from hydrocarbon oil mixtures which contain in addition substantial amounts of mono-olefines, naphthenes, aromatics and heterocyclic compounds.

In conducting treating operations within the scope of the present invention many methods and many types of equipment may be employed and various methods may be utilized in the preparation of the reagent. A convenient method of preparing reagents consists in passing partially converted gas mixtures from contact processes thru sulfuric acids at low temperatures, the actual temperatures employed being dependent upon the composition of the gas mixtures as regards relative amounts of sulfur dioxide and trioxide. In this manner the acid is simultaneously saturated with sulfur dioxide and increased in sulfuric acid content by absorption of sulfur trioxide. If contact gases are not available sulfur or pyrites burner gases may be passed thru until the acid reaches a state of substantial saturation with sulfur dioxide. In conducting operations at low temperatures both acid and oils to be treated may be pre-cooled by suitable refrigerating means and temperatures maintained at low points by careful insulation and circulation of cooling agents at points where temperatures are inclined to rise due to heat of reaction. One method of treating is to place the oil to be treated in a cone bottomed receptacle capable of withstanding moderately superatmospheric pressures and circulate the treating agent by means of acid-resisting centrifugal pumps from the bottom of the cone into sprays in the top of the receptacle, suitable pressures being maintained by the addition of sulfur dioxide either in vapor or liquid form. Operations may also be conducted in equipment designed to permit continuous operation, the reagent and oil being pumped together thru mixing devices consisting of a succession of orifices or other means employed to insure turbulence and through mixing, the products discharged into settling chambers from which spent reagent is withdrawn for regeneration and supernatant treated oil is removed to subsequent equipment for neutralization and final washing. When pressure is employed it is convenient to utilize the cooling effect produced upon reducing pressure to liberate sulfur dioxide to maintain the temperature of treatment, the gas being taken by suitable compressors and again brought to a condition of pressure necessary for injection into and saturation of acids to be employed as treating agents.

It has been found that by the use of the reagents of the types included within the scope of the invention that oxidation reactions in the treatment of cracked distillates even of a highly unsaturated character are substantially absent due to the artificially imposed partial pressure of the sulfur dioxide. The compounds dissolved by the acid mixture are evidently loosely combined therewith and are released in substantially their original form upon dilution with suitable precautions to prevent rise of temperature, thus insuring simple and easy regeneration of the acids.

As an example of the results obtainable by the operation of the process the following may be cited. A cracked distillate produced by the relatively high temperature and low pressure cracking of a California gas oil is found to contain sulfur in an amount equal to 0.8% and components removable by approximately 66° Bé. sulfuric acid of approximately 15% when the acid is used in excess. After ordinary treatment with sulfuric acid, e. g. with 7 lbs. per barrel of distillate and a redistillation of the treated distillate a gasoline will be produced with a gum content as determined by the copper dish method of as high as 100 mg. per 100 cc. of gasoline and the sulfur content may be still as high as 0.3%. If this same distillate is treated with approximately 96% sulfuric acid saturated with sulfur dioxide at a temperature of 10° above zero F. and a pressure of approximately 30# per square in., the acid being used at the rate of approximately 5 lbs. per bbl. of oil, the redistillation for gasoline which follows neutralization and washing may yield a gasoline of a gum content of approximately 50 mg. and a sulfur content of 0.1% or less. The color of the treated and redistilled gasoline may be considerably improved and may be as high as 30 on the Saybolt scale, this dropping to only 25 after 4 hrs. exposure to sunlight.

The foregoing specification has described and partially exemplified a treating process for cracked distillates which is capable of many modifications and applications and is therefore not limited to the specific disclosures.

I claim as my invention:

1. In a process for refining the overhead products of hydrocarbon oil cracking, the step which comprises subjecting said product to the action of a solution of sulphur dioxide in sulphuric acid at a temperature below 32° F.

2. In a process for refining the overhead products of hydrocarbon oil cracking, the step which comprises subjecting said product to the action of a solution of sulphur dioxide in sulphuric acid at a temperature below 32° F. under superatmospheric pressure.

3. In a process for refining the overhead products of hydrocarbon oil cracking, the step which comprises subjecting said product to the action of a solution of sulphur dioxide in sulphuric acid at a temperature below 20° F. and above −15° F.

4. In a process for refining the overhead products of hydrocarbon oil cracking, the step which comprises subjecting said product to the action of a solution of sulphur dioxide in sulphuric acid at a temperature below 20° F. and above −15° F. under superatmospheric pressure.

5. In the refining of the overhead products of hydrocarbon oil cracking, the step which comprises subjecting said products to the action of a solution of sulphur dioxide in sulphuric acid of a concentration of more than 95% at a temperature below 50° F.

6. In the refining of the overhead products of hydrocarbon oil cracking, the step which comprises subjecting said products to the action of a solution of sulphur dioxide in sulphuric acid of a concentration of more than 95% at a temperature below 50° F. under superatmospheric pressure.

In testimony whereof I affix my signature.

JACQUE C. MORRELL.